Jan. 8, 1935. J. Q. SHERMAN Re. 19,418

CASH DRAWER MANIFOLDING DEVICE

Original Filed May 2, 1923 2 Sheets-Sheet 1

INVENTOR.

John Q. Sherman by Allen & Allen

ATTORNEYS

Jan. 8, 1935. J. Q. SHERMAN Re. 19,418
CASH DRAWER MANIFOLDING DEVICE
Original Filed May 2, 1923 2 Sheets-Sheet 2
Fig. 2.
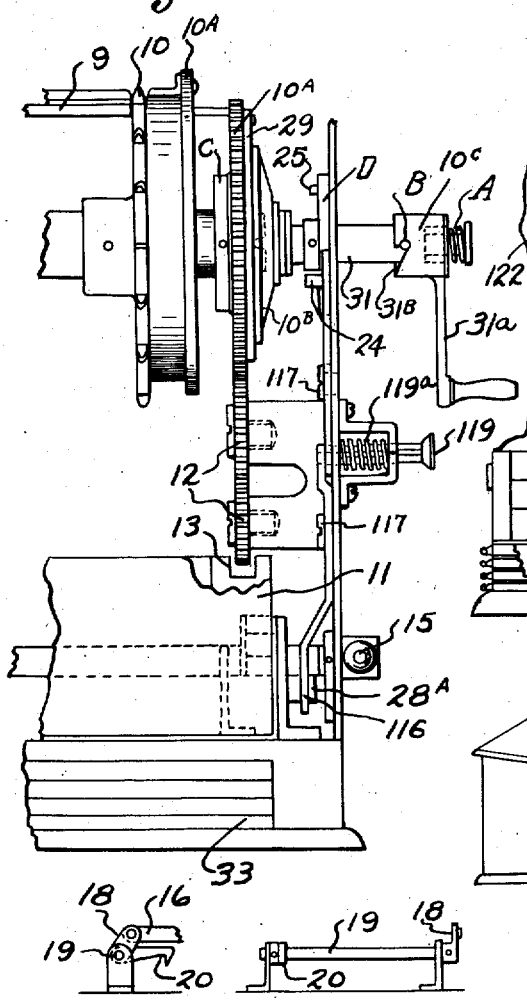
Fig. 3.
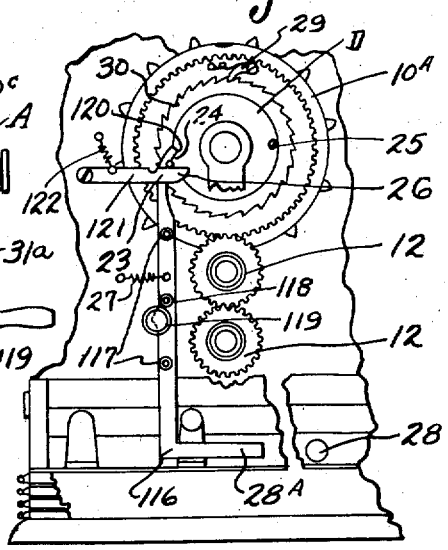
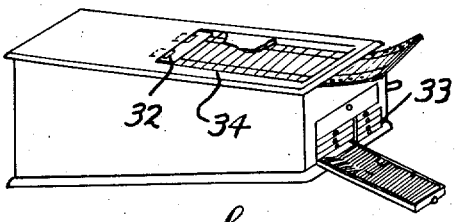
Fig. 4.
Fig. 5.
INVENTOR.
John Q. Sherman
BY
Asa M. Allen
ATTORNEYS Reissued Jan. 8, 1935

Re. 19,418

UNITED STATES PATENT OFFICE 19,418

CASH DRAWER MANIFOLDING DEVICE

John Q. Sherman, Dayton, Ohio, assignor, by direct and mesne assignments, to The Standard Register Company Original No. 1,767,486, dated June 24, 1930, Serial No. 636,239, May 2, 1923. Application for reissue August 27, 1931, Serial No. 559,789

9 Claims. (Cl. 235—4)

My invention relates to manifolding devices, such as, for example, autographic registers, which are combined with cash drawers, so related that the operation of the paper feed for the manifolder and the movement of the cash drawer are interrelated.

In various applications for patent co-pending with this application, particularly Serial No. 613,842, filed January 20, 1923 and Serial 613,843, filed January 20, 1923, I have described devices whereby the feed of the paper was accomplished by a spring which was set by the cash drawer, or operated directly by the opening movement of the cash drawer, by means of a spring, which acted on the cash drawer.

In this application it is my object to provide a machine of the same type, but in which the manual inward movement of the cash drawer operates the paper feeding device.

In this connection I have provided also for a separate manual control of the paper feeding devices, but have not relieved the feeding devices from an operation whenever the cash drawer is pushed in.

It will be understood that all that is necessary is to enforce a record, either blank, or filled, each time the drawer is opened, and that it may readily be that several sales slips often need to be issued for one opening of the drawer.

It thus becomes a part of my mechanism to prevent the manual operation of the paper feed when the drawer is in closed position, and enforce a feed action direct by the drawer when it is being closed from open position. Having accomplished these functions the operator may safely be permitted to make any other entries he may see fit, since it is made practically certain that he will not take cash or make change in the drawer without making some entry of it on the manifolder.

Another object of my invention, which has particular application to the form of paper feed adopted by me, is to provide an additional safeguard for the pin wheel, true alignment feed mechanism adopted in this case.

It is not practical to automatically operate a paper feed unless it is of the pin wheel type for manifolding, since accuracy of feed must be obtained, or the automatic feature will not serve its purpose.

I accomplish my various objects by that certain construction and arrangement of parts to be hereinafter more specifically pointed out and claimed.

In the drawings:

Figure 2 is a front detail elevation showing the paper feed mechanism, and the cash drawer connections therewith.

Figure 3 is a side elevation taken from the opposite side to Figure 1, on a larger scale, and showing the parts illustrated in Figure 2.

Figure 4 is a perspective view of the complete device.

Figure 5 is a detail elevation and projection of the cash drawer latch.

Figure 6:
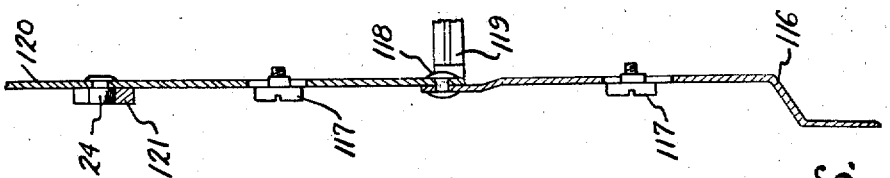
Figure 6 is a detail section of the toggle arm.
Figure 1:
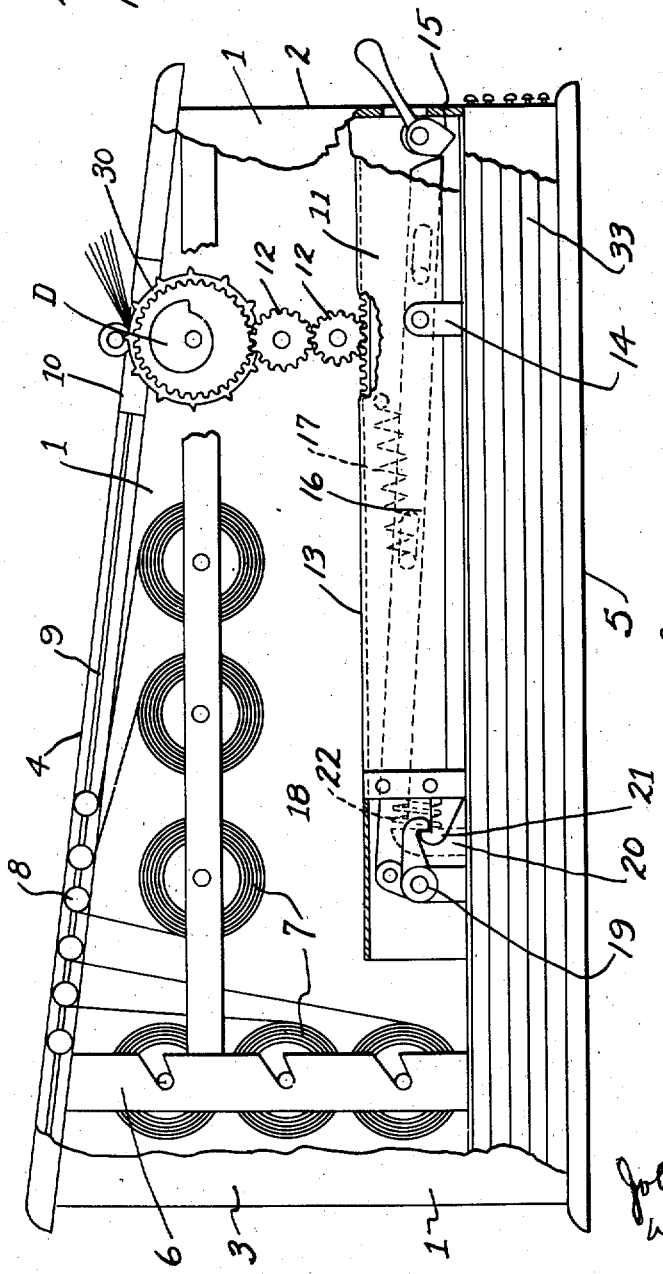
Figure 1 is a side elevation of the entire device, with the side wall toward the observer removed.

The cabinet, adopted for purposes of illustrating my device, is formed with sides 1, a front 2, rear 3, top 4, base 5 and paper roll carrying rack 6. Rolls of paper 7 are mounted in this rack in the manner desired, and the webs of paper are fed up over idlers 8, and over a writing support or tablet 9.

I have adopted as a form of true alignment feed a pair of sprockets or pin wheels 10, which are adapted to engage a series of interspaced holes, preferably arranged marginally in all forms. The paper webs are printed into separate forms of a length for which the machine is built. That is to say, one complete revolution of the pin wheels, preferably, will feed exactly one form length from the rolls, and issue from beneath the top of the machine, one full length form.

The cash drawer 11 slides in and out in the cabinet on roller supports 14, which engage in channels in the sides of the drawer. A rack bar 13 on the one side of the drawer, maintains constant mesh with a train of gears 12, which drive the paper feed, as will be noted.

Pivotally mounted so as to project from the cabinet at one front corner, is a cam lever 15, which moves the bar 16 rearwardly, lengthwise. This bar is held in place loosely on the side of the cabinet, and is pulled forwardly against the cammed movement thereof by a spring 17.

At the rear of the cabinet, is mounted on suitable supports a rock shaft 19, which is connected by an arm 18 to the bar 16. The rock shaft has a latch hook 20, which engages with a hook 21 on the back wall of the cash drawer, thus holding the drawer closed. This latch acts under pressure of the spring 17.

A cup and spring device 22 acts as a projector of the drawer, so that when it is released it will be projected to open position, this spring device 22 being energized by the last portion of the inward movement of the drawer.

The pin wheels 10 are mounted fast on a shaft 31, extending out through the frame of the device, which shaft is equipped with an operating crank similar to a crank used to impart a starting movement to an internal combustion engine. Thus the handle or crank 31*a*, has a barrel 10*c*, that is held by a light spring A to the end of the shaft 31. The shaft has a stud B thereon, and the barrel has a notch 31B, to engage the stud in the direction of forward feed of the pin wheel shaft. A drive of the shaft from the cash drawer will not revolve this handle, as it will not be pressed strongly enough over the stud, to carry around with the shaft but will hang free by gravity.

On a loose collar C on the feed shaft 31, is a large gear 10A, which is free to revolve on the collar. This gear meshes with the upper one of the two gears 12, so as to be driven by said gears 12 whenever the cash drawer moves. The gear carries a pawl 29, which meshes with a ratchet 30 also on the collar but fast thereon.

Fast on the feed shaft is a cupped disk 10B which presses against the outer face of the collar C, and thus frictionally connects the collar to the feed shaft. By this mechanism the paper feed is revolved forwardly when the cash drawer is pushed inwardly, but is freed from motion when the drawer is projected outwardly, and any tendency of the drawer to overfeed is compensated. Also the hand crank can be used to revolve the feed shaft when the drawer is not moving, due to the fact that the pawl drive will permit the friction disk, collar and ratchet to turn free in the feeding direction.

I provide a paper feed stop to limit the feeding operation to single complete revolutions of the feed shaft.

Thus the feed shaft has a cam D thereon, which has a nose 120, adapted to engage the end of toggle device 116. The toggle is pivoted together at 118, and is mounted on the side of the machine by two studs 117 which pass through slots in the toggle arms to permit flexing. A push pin 119 having a sloping face contacts with the toggle near its pivot 118, and bends it out at this point, thereby swinging the end in contact with the cam nose out of its way. A latch lever 121 having a notch 23 therein holds the end of the toggle out of the path of the cam, by engaging a pin 24 on the end of the toggle. The push pin has a spring about it, to keep it with its tip only lying against the toggle, as indicated at 119*a*. The latch 121 is under the pull of a spring 122, and is tripped by a pin 25 on the cam, to release the end of the toggle, during each operation of the feed, thereby permitting the spring 27 of the toggle to pull it back into a straight line, and bring its end against the cam again.

The cash drawer has a stud 28 thereon which when the drawer is opened about as far as it will go, will contact with the end 28A of the toggle, and thereby bend it at the middle, as in the case of the push pin, thus releasing the feed shaft for one operation. During the closed position of the drawer, and until it is open again, the feed shaft cannot turn unless the push pin is operated.

I have shown a compartment beneath the cash drawer for a filing folder or series of folders, 33, (Fig. 4). Also, and this I consider an important feature, I provide a device for assisting the pin wheels in maintaining a perfect feed on the paper strips.

The top 4 of the cabinet is provided with an opening 34 of the usual character to expose the webs of paper for making of entries, which will be duplicated by carbon paper, in the usual type of manifolding machine. At the receiving end of the opening I mount a hinged plate 32, which merely rests of its own weight on the top most sheet. This plate tends to hold the sheets of paper steady on the writing tablet, and should not be heavy enough to exert any real friction, other than enough to steady it, and supplement the natural hold-back on the paper webs. I find that this device, specially provided for the purpose, as distinguished from any of the usual carriers or guides for the paper, particularly in cases where the holes in the paper are substantially larger than the pins on the pin wheels, will give a steadying action which is very valuable, and also hold the paper against shifting about while being written upon.

It is not believed to be necessary to review in detail the operation of the machine. When the drawer is projected open upon releasing it, the paper feed stands still, and is in fact locked against movement. When the drawer is pushed in, the lock has been released, and the rack on the drawer will operate the pin wheels, until the drawer is clear in, or the paper feed stop comes into play, whereupon the friction in the driving train will slip. A back and forth operation of the drawer, short of bringing it clear out after it has been pushed almost in, will not bring about more than one feeding of paper, and such a movement amounts to a complete movement of the drawer anyhow, and ought to be recorded on the forms.

I have not shown any retained record rewind device but it will be understood that any accepted form of rewind may be employed.

Having thus described my invention, what I claim as new and desire to secure by Letters Patent is:—

1. In combination, a manifolding device, having an independent paper feed means and a cabinet with a drawer in the cabinet, the manifolding device having a paper feed element, and means on the drawer for driving said element to feed the paper upon inward movement of the drawer into the cabinet, and means to prevent said independent means from operation except when the drawer is open.

2. In combination, a manifolding device, having an independent paper feed means and a cabinet with a drawer in the cabinet, the manifolding device having a paper feed element, and means on the drawer for driving said element to feed the paper upon inward movement of the drawer into the cabinet, and means to prevent said independent means from operation except when the drawer is open, and an element under manual control for inhibiting the action of said preventing means.

3. In combination, a manifolding device, and a drawer and cabinet arranged together for conjoint operation, the manifolding device having a paper feed element, means for locking said element after predetermined movement thereof, means on the drawer for unlocking the same, and means on the drawer to drive said paper feed upon the inward movement of the drawer in the cabinet.

4. In combination, a manifolding device, and a drawer and cabinet arranged together for conjoint operation, the manifolding device having a paper feed element, means for locking said element after predetermined movement thereof, means on the drawer for unlocking the same, and means on the drawer to drive said paper feed upon the inward movement of the drawer in the cabinet, said unlocking means adapted to come into operation only in the open position of the drawer.

5. In combination, a manifolding device, having an independent paper feed means and a cabinet with a drawer in the cabinet, the manifolding device having a paper feed element, and means on the drawer for driving said element to feed the paper upon movement of the drawer in the cabinet, and means to prevent said independent means from operation except when the drawer is open, said independent means comprising a handle, and engaging means between the handle and the feed element adapted to permit the handle to lie idle when the feed is being actuated from the drawer.

6. In a manifolding device, the combination with a casing having a top opening for exposure of paper, a writing support for paper beneath the opening, a feed for the paper adapted to draw it across the said writing support, and comprising rotary pin bearing bodies of which the pins engage holes formed in predetermined successive spacing in the paper, and a weight engaging the paper by gravity at a point at the portion of the writing support away from the feed.

7. In a manifolding apparatus a main frame, a support over which multiple superposed record strips are drawn from a source of supply past a writing position, a pin wheel feeding device engageable in marginally punched holes in the record strips, substantially larger than the engaging pins of the pinwheel feeding device, and a safeguard member carried by the main frame overlying the strip support in transverse relation with the strips intermediate the source of supply and the writing position and imposing thereon a frictional steadying pressure supplemental to the normal hold-back effect upon the strips.

8. In a manifolding apparatus, a main frame including a support over which multiple superposed record strips are advanced from a source of supply past a writing position, a pin wheel feeding device engageable in marginally punched apertures in the strips which are substantially larger than the pins of the pin wheel feeding device engageable therein, and a pressure member common to the multiple strips carried by the main frame in overlying relation with the strip support intermediate the source of supply and the point of engagement by the pin wheel feeding device, in contact with which the strips are collectively drawn and coacting with the support to prevent the strips from shifting about from the position to which they are advanced by the pin wheel feeding device.

9. In a manifolding apparatus, a main frame including a support over which multiple superposed record strips may be drawn in unison from a source of supply past a writing position, a pin wheel feeding device engageable in marginally punched holes in the record strips substantially larger than the feeding pins engageable therein whereby the strips are capable of shifting about at the writing position at the completion of the feeding operation, and a device carried by the main frame in overlying relation with the strip support common to the multiple strips and engageable therewith intermediate the source of supply and the writing position and exerting thereon sufficient frictional pressure to steady the strips against shifting about at the writing position.

JOHN Q. SHERMAN.